UNITED STATES PATENT OFFICE.

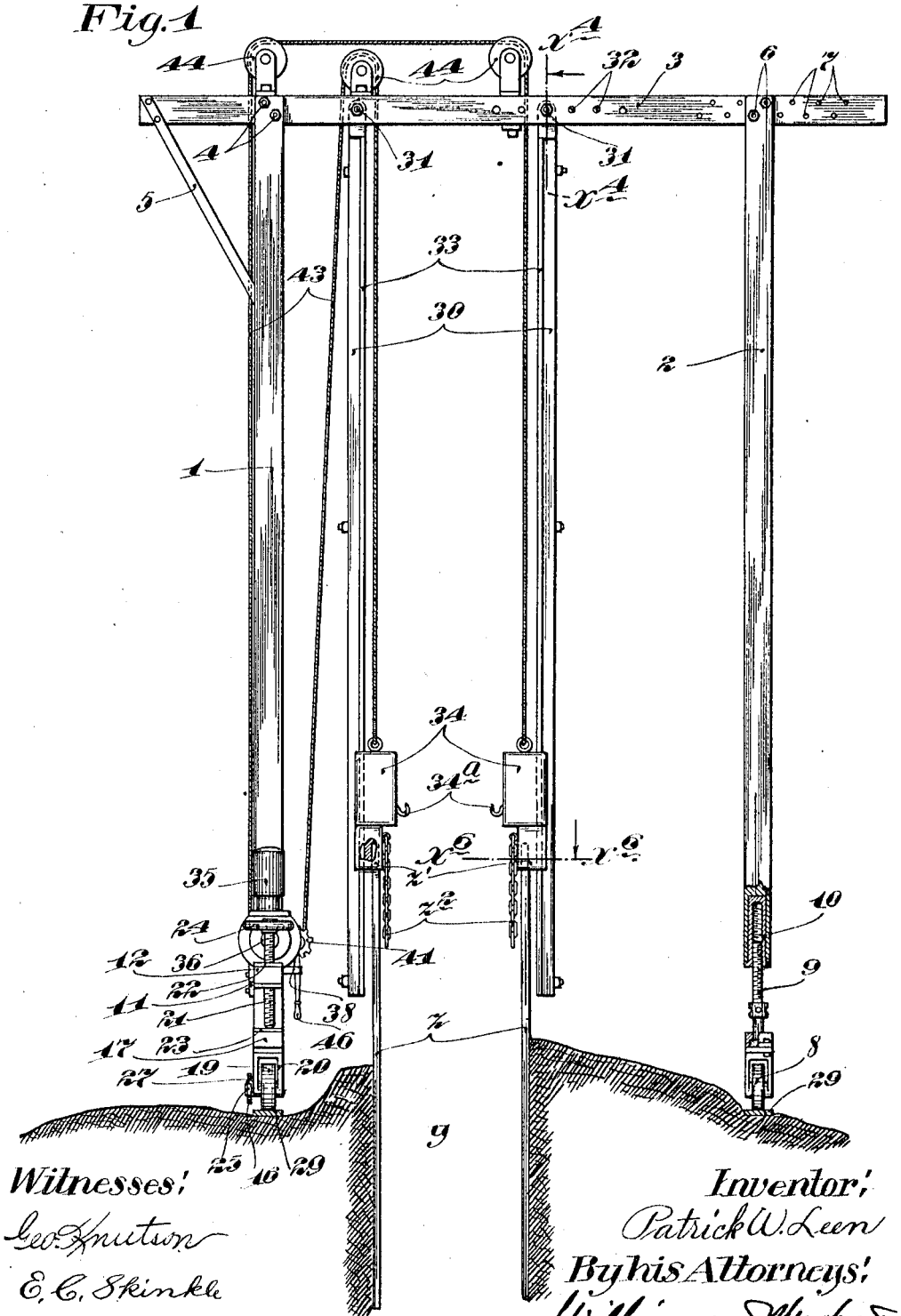

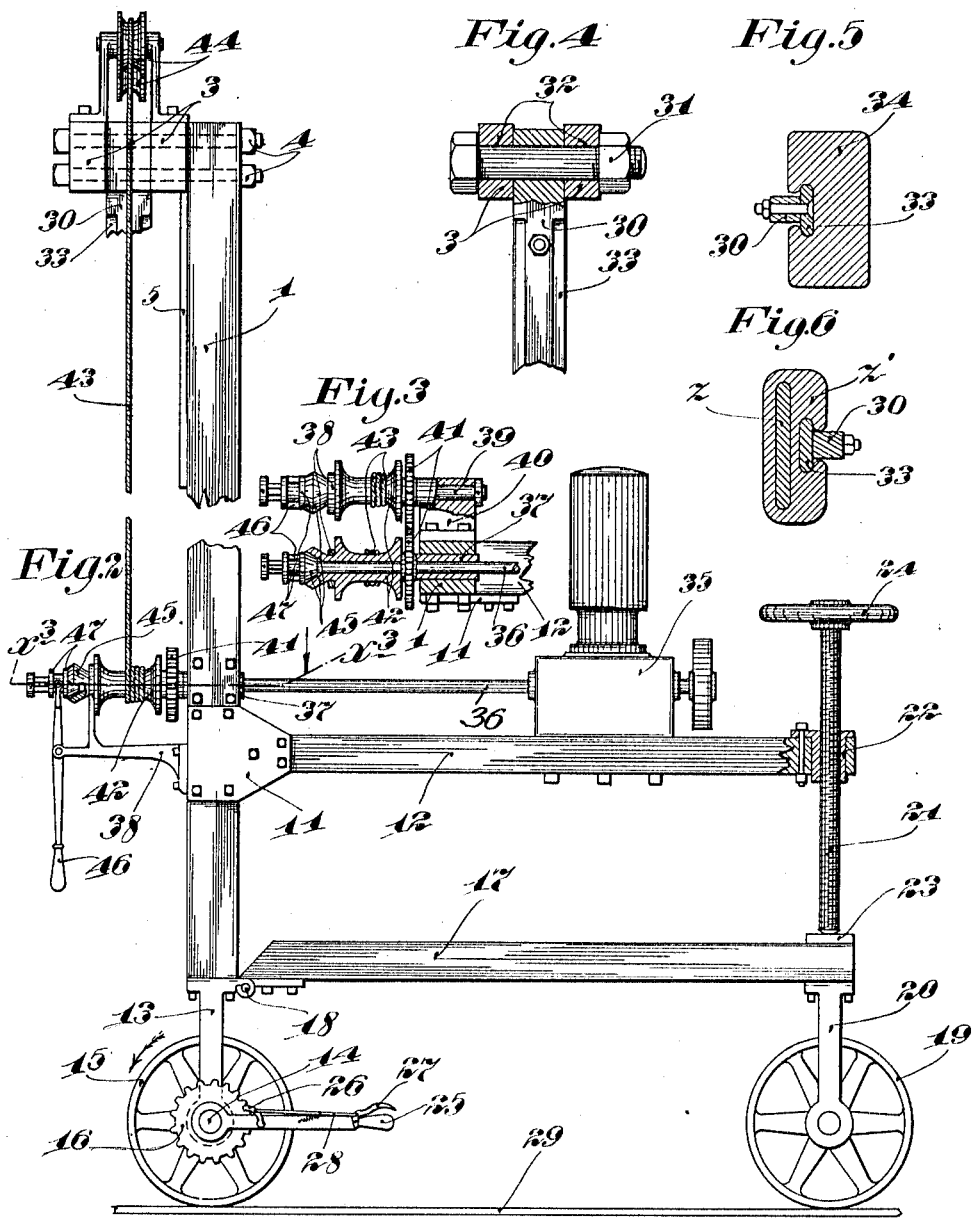

PATRICK W. LEEN, OF MINNEAPOLIS, MINNESOTA.

PILE-DRIVER.

1,088,710.  Specification of Letters Patent.  Patented Mar. 3, 1914.

Application filed June 18, 1913. Serial No. 774,329.

*To all whom it may concern:*

Be it known that I, PATRICK W. LEEN, a citizen of the United States, residing at Minneapolis, in the county of Hennepin and State of Minnesota, have invented certain new and useful Improvements in Pile-Drivers; and I do hereby declare the following to be a full, clear, and exact description of the invention, such as will enable others skilled in the art to which it appertains to make and use the same.

My invention has for its object to provide an improved pile driver especially adapted for driving sheathing and, to this end, it consists of the novel devices and combinations of devices hereinafter described and defined in the claims.

In the accompanying drawings, which illustrate the invention, like characters indicate like parts throughout the several views.

Referring to the drawings: Figure 1 is a rear elevation of the improved machine in operative position; Fig. 2 is a side elevation of the same, on an enlarged scale, some parts being broken away and some of the exposed parts being shown in section; Fig. 3 is a detail view principally in horizontal section, taken on the line $x^3$ $x^3$ of Fig. 2; Fig. 4 is a detail view, on an enlarged scale, taken on the line $x^4$ $x^4$ of Fig. 1, showing the pivotal connection of one of the driving weight guides; Fig. 5 is a detail view in transverse section, showing one of the driving weights and guide therefor; and Fig. 6 is a detail view in transverse section, taken on the line $x^6$ $x^6$ of Fig. 1, on an enlarged scale.

The main frame of the machine is an inverted approximately U-shaped structure arranged to straddle a ditch Y, into which is driven a double row of sheathing Z, made up of a plurality of flat boards placed edge to edge, for the well known purpose of preventing the sides of the ditch from caving in. This frame comprises a pair of heavy upright timbers 1 and 2 connected, at their upper ends, by a pair of laterally spaced parallel bars 3. These bars 3 are permanently secured, at one end, to the upright 1 by nut equipped bolts 4 and a diagonal brace rod 5, and the upright 2 is secured to the bars 3, for adjustments toward and from the upright 1, by a pair of nut equipped bolts 6, adapted to be passed through any one pair of a plurality of longitudinally spaced holes 7 formed in the bars 3. The upright 2 is supported above a ground engaging wheel 8 adjustably connected thereto by a vertically extended rod 9, swiveled to the bracket of said wheel 8 and having screw threaded engagement with a nut sleeve 10, which is countersunk in the lower end of the upright 2 and held against rotation with respect thereto. By manipulation of the screw rods 9, the transverse bars 3 may be horizontally adjusted. Secured, by a bracket 11, to the intermediate portion of the upright 1 is a rearwardly extended supplemental frame section 12, as shown, preferably constructed from a single heavy horizontally extended timber. The upright 1 rests on and is secured to a wheel bracket 13 in which is loosely journaled a stub shaft 14, having keyed thereto a ground engaging wheel 15 and a spur gear 16.

Located directly under the frame extension 12 is a supplemental frame 17 also, as shown, preferably constructed from a single heavy timber secured, at its forward end, to the wheel bracket 13 by a hinge 18. A ground engaging wheel 19 is journaled in a wheel bracket 20 secured to the supplemental frame 17, and supports the rear end of said frame. The rear or free end of the frame extension 12 is adjustably supported from the supplemental frame 17 by a long, vertically extended screw rod 21, having screw threaded engagement with a nut block 22 secured to the frame extension 12. The lower end of this screw rod 21 rests on a bearing plate 23 secured to the supplemental frame 17, and the upper end thereof is provided with a hand wheel 24, by which said screw rod may be turned.

For imparting rotary movement to the ground wheel 15, in order to advance or back up the improved machine along the ditch Y, a hand lever 25 is loosely pivoted to the stub shaft 14, adjacent to the spur gear 16, and is provided with a pivoted driving dog 26, for coöperation with the teeth of the spur gear 16. A hand piece 27, for actuating said driving dog 26, is connected thereto by a spring held link 28. As shown in the drawings, the ground engaging wheels 8, 15 and 19 are supported on flat rails 29 loosely placed on the ground on each side of the ditch Y.

A pair of laterally spaced guide posts 30 are suspended from the bars 3 by nut equipped bolts 31. These bolts permit free oscillatory movement of the guide posts 30 between the uprights 1 and 2. The lower ends of the guide posts 30 embrace the double row of sheathing Z, as shown in Fig. 1, and the guide post 30 nearest the upright 2 is secured, for lateral adjustment toward and from the other of said posts, by a plurality of alined longitudinally spaced perforations 32 in the bars 3, through which the pivot bolts 31 of said guide post may be passed. This adjustment permits the guide posts 30 to be spaced apart different distances, in the construction of ditches of different widths. Bolted to the inner face of each guide post 30 is a guide strip 33, of greater width than the said guide post, on which is slidably mounted a driving weight 34 having dove-tail interlocking engagement with the guide strip 33.

Removable metallic caps Z' are adapted to be telescoped onto the upper ends of the boards comprising the sheathing Z, for the well known purpose of preventing the driving weights 34 from splitting or breaking said sheathing Z. Another important function of these caps Z' is to hold the free ends of the guide strips 33 in their proper relation to the sheathing Z, in order to direct the driving weights 34 onto the caps Z'. Any suitable means may be provided for attaching the guide strips 33 to the caps Z', but, as shown, they preferably have dove-tail sliding engagement with the said guide strips. For removing the caps Z' from the sheathing, in case the same should become stuck thereon, said caps Z' are provided with short chains $Z^2$, adapted to be secured to hooks $34^a$ on the driving weights 34. Obviously, by raising the driving weights 34, the caps may be easily removed from the sheathing.

An explosive engine, indicated as an entirety by the numeral 35, is bolted to the frame extension 12, for raising the driving weights 34. The engine 35 also acts as a counterweight for the main frame of the machine and holds the adjusting screw 21 in engagement with the supplemental frame 17. The engine shaft 36 extends approximately parallel with the frame extension 12 and its outer end portion is journaled in a sleeve 37 passed through the upright 1 and in a bracket 38 bolted to the outer vertical face of the upright 1. A countershaft 39, parallel with the engine shaft 36, is journaled in a bearing 40 on the upright 1 and the bracket 38 and is driven from the engine shaft 36 by intermeshing gears 41 keyed to said shafts. A pair of windlass drums 42 are loosely journaled one on the engine shaft 36 and the other on the countershaft 39. Hoisting cables 43 connect the windlass drums 42 to the driving weights 34 and their intermediate portions run over guide sheaves 44 on the bars 3. The windlass drums 42 are independently controlled by friction cone clutches 45, the movable members of which are mounted, for endwise sliding movement, on the engine shaft 36 and countershaft 39, but are held for rotation therewith. The prongs of a pair of independently operated shipper levers 46, pivotally connected to the bracket 38, engage shipper collars 47 on the movable members of the clutches 45. It is evident that the sheathing Z may be removed from the ditch Y, after the same is filled, by the cables 43.

The operation of the improved machine may be briefly described as follows: The machine may be moved along the ditch Y on the rail 29 by means of the lever 25. By lifting on the said hand lever, motion will be imparted to the wheel 15 in the direction of the arrow marked on Fig. 2 of the drawings. A reverse motion may be imparted to said wheel 15 by placing the hand lever 25 on the stub shaft 14 in reverse order from that shown in the drawings. By manipulating the screw rods 9 and 21, the uprights 1 and 2 may be set in true vertical positions, irrespective of the irregularities in the ground on which the machine rests. This same adjustment will level up the engine 35 and shaft 36.

Since the guide posts 30 are supported for pendulum-like movement, it is not necessary to set the machine as accurately as would otherwise be required, as the caps Z' will hold the lower ends of the guide strips in their proper relation to the sheathing Z to direct the driving weights onto said caps. The supports for the guide posts 30 will also permit said guides to be swung edgewise a limited distance, in order to successively drive several of the boards from which the sheathing is constructed, without having to move the machine.

From the foregoing description, it is evident that the machine is entirely self-sustaining and does not require the use of guy ropes or other anchoring means.

The term "sheathing" is herein used in a broad sense to cover piles of all kinds.

What I claim is:

1. The combination with an upright frame, of a guide secured to said frame, for pendulum-like movement, a driving weight slidably mounted on said guide, means for raising and releasing said weight, means for adjusting said frame in a vertical plane that transversely intersects the plane of oscillatory movement of said guide, and means for adjusting said frame in the plane of the oscillatory movement of said guide.

2. The combination with an upright frame, of a pair of laterally spaced guides secured to said frame, for pendulum-like movement, means for adjusting one of said guides toward and from the other, driving weights slidably mounted on said guides, and means for raising and releasing said weights.

3. The combination with an upright frame, of a pair of laterally spaced guides secured to said frame for pendulum-like movement, means for adjusting one of said guides toward and from the other, driving weights slidably mounted on said guides, means for raising and releasing said weights, and means for adjusting said frame in a vertical plane that transversely intersects the plane of oscillatory movement of said guides.

4. The combination with an upright frame, of a pair of laterally spaced guides secured to said frame, for pendulum-like movement, means for adjusting one of said guides toward and from the other, driving weights slidably mounted on said guides, means for raising and releasing said weights, means for adjusting said frame in a vertical plane that transversely intersects the plane of oscillatory movement of said guides, and means for adjusting said frame in the plane of the oscillatory movement of said guides.

5. The combination with an upright frame having a lateral frame extension, of means for vertically adjusting the outer end of said frame extension, an engine mounted on said frame extension and having its driving shaft extended approximately parallel with said frame extension, a driving weight, a guide on said upright frame for said driving weight, and connections between said engine shaft and driving weight for raising and releasing said weight.

6. The combination with an upright frame having a lateral frame extension, of a supplemental frame hinged to said upright frame in a plane below said frame extension, an adjustable connection between said frame extension and said supplemental frame, an engine mounted on said frame extension and having its driving shaft extended approximately parallel with said frame extension, a driving weight, a guide on said upright frame for said driving weight, and connections between said engine shaft and driving weight, for raising and releasing said weight.

7. The combination with a main frame, comprising a pair of uprights connected, at their upper ends, by a transverse bar and means for longitudinally adjusting one of said uprights, of a guide pivotally secured, at its upper end, to said bar, for oscillatory movement, a driving weight slidably mounted on said guide, and means for raising and releasing said driving weight.

8. The combination with a main frame, comprising a pair of uprights connected, at their upper ends, by a transverse bar, means for longitudinally adjusting one of said uprights, and means for adjusting said uprights in a vertical plane transversely of said bar, of a guide pivotally secured at its upper end to said bar, for oscillatory movement, a driving weight slidably mounted on said guide, and means for raising and releasing said driving weight.

9. The combination with a main frame, comprising a pair of uprights connected, at their upper ends, by a transverse bar, for adjustments toward and from one another, means for longitudinally adjusting one of said uprights, and means for adjusting said uprights in a vertical plane that transversely intersects said bar, of a pair of laterally spaced guides pivotally secured to said bar, for pendulum-like movement between said uprights, means for adjusting one of said guides toward and from the other, driving weights slidably mounted on said guides, and means for raising and releasing said weights 10. The combination with an upright support provided with a rearwardly projecting frame extension and having secured to its upper end one end of a horizontally extended bar, of a supplemental frame hinged to said upright frame, in a plane below said frame extension, an adjustable connection between said frame extension and said supplemental frame, a longitudinally adjustable support between the ground and the outer end of said bar, an oscillatory guide strip pivotally secured, at its upper end, to said bar, a driving weight slidably mounted on said strip, and means for raising and releasing said weight.

11. The combination with an upright support provided with a rearwardly projecting frame extension and having secured to its upper end one end of a horizontally extended bar, of a supplemental frame hinged to said upright frame, in a plane below said frame extension, an adjustable connection between said frame extension and said supplemental frame, a longitudinally adjustable support between the ground and the outer end of said bar, an oscillatory guide strip pivotally secured, at its upper end, to said bar, a driving weight slidably mounted on said strip, and means for raising and releasing said weight, said upright support, supplemental frame and longitudinally adjustable support having ground engaging wheels.

12. The combination with an upright frame, of a guide secured to said frame, for pendulum-like movement, a driving weight slidably mounted on said guide, means for raising and releasing said weight, and means for securing the free end of said guide to a pile in a position to direct said driving weight thereon.

13. The combination with an upright frame, of a guide secured to said frame, for pendulum-like movement, a driving weight slidably mounted on said guide, means for raising and releasing said weight, and a pile cap slidably mounted on said guide.

In testimony whereof I affix my signature in presence of two witnesses.

PATRICK W. LEEN.

Witnesses:
 EDITH E. HANNA,
 HARRY D. KILGORE.

Copies of this patent may be obtained for five cents each, by addressing the "Commissioner of Patents, Washington, D. C."